(12) United States Patent
James et al.

(10) Patent No.: US 8,730,852 B2
(45) Date of Patent: May 20, 2014

(54) ELIMINATING FALSE AUDIO ASSOCIATED WITH VOIP COMMUNICATIONS

(75) Inventors: James James, Farmingdale, NJ (US); Allen Mollica, Middlesex, NJ (US); David Ramsden, Wall, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 592 days.

(21) Appl. No.: 12/636,175

(22) Filed: Dec. 11, 2009

(65) Prior Publication Data

US 2011/0142033 A1   Jun. 16, 2011

(51) Int. Cl.
*H04B 3/20* (2006.01)
*H04L 12/66* (2006.01)
*H04M 9/08* (2006.01)

(52) U.S. Cl.
USPC ............. 370/286; 370/352; 379/406.01

(58) Field of Classification Search
None
See application file for complete search history.

(56) References Cited

U.S. PATENT DOCUMENTS

| 7,126,711 | B2 | 10/2006 | Fruth | |
| 2002/0154760 | A1* | 10/2002 | Branden | 379/386 |
| 2003/0212550 | A1* | 11/2003 | Ubale | 704/215 |
| 2004/0181402 | A1* | 9/2004 | Bartkowiak | 704/226 |
| 2005/0058120 | A1* | 3/2005 | Lam et al. | 370/352 |
| 2007/0025546 | A1* | 2/2007 | Jabri et al. | 379/386 |
| 2007/0127711 | A1* | 6/2007 | LeBlanc | 379/406.16 |
| 2007/0174052 | A1* | 7/2007 | Manjunath et al. | 704/219 |
| 2009/0109881 | A1* | 4/2009 | Li et al. | 370/280 |
| 2009/0257579 | A1* | 10/2009 | Takada | 379/406.08 |
| 2010/0329637 | A1* | 12/2010 | Schultz et al. | 386/248 |
| 2012/0044823 | A1* | 2/2012 | Udvuleanu et al. | 370/252 |

FOREIGN PATENT DOCUMENTS

WO   WO 2009/112891 A1 *   9/2009   ........... H04M 7/12

OTHER PUBLICATIONS

H. Schulzrinne (Columbia University) and S. Petrack (MetaTel), "RTP Payload for DTMF Digits, Telephony Tones and Telephony Signals," http://www.ietf.org/rfc/rfc2833.txt, 29 pages, May 2000.

* cited by examiner

*Primary Examiner* — Chirag Shah
*Assistant Examiner* — Suk Jin Kang
(74) *Attorney, Agent, or Firm* — Hoffmann & Baron, LLP

(57) ABSTRACT

Embodiments are directed to eliminating false audio using an egress gateway in a communications network. At least one false audio packet is received by an egress gateway. The false audio packet includes false audio. A DTMF packet is received by the egress gateway. The DTMF packet is received subsequent to the at least one false audio packet. The false audio in the false audio packet is replaced with a substitute signal by the egress gateway.

13 Claims, 3 Drawing Sheets

ELIMINATING FALSE AUDIO ASSOCIATED WITH VOIP COMMUNICATIONS

BACKGROUND

1. Technical Field

The present invention relates to eliminating false audio associated with Voice over Internet Protocol (VoIP) communications.

2. Brief Discussion of Related Art

In VoIP networks, an access VoIP gateway can perform a signal classification function to classify a signal as a voice signal or a dual-tone multi-frequency (DTMF) signal. DTMF signals use two frequencies to represent digits and symbols of a phone keypad. When any key on the keypad is pressed the two tones are generated based on a frequency pair associated with the key that is pressed. These tones can be decoded by a network component to determine which key was pressed. DTMF signals are typically not transmitted over a VoIP network as audio, but rather as a packet including a characterization of parameters associated with the DTMF signal which is transmitted over the VoIP network.

When the signal is classified as a voice signal, the voice signal is processed via a voice codec implemented by the access VoIP gateway in the VoIP network, and the output (e.g., an encoded voice signal) of the voice codec can be encapsulated using a Real-time Transport Protocol (RTP) audio packet that can be transmitted through the VoIP network to an egress VoIP gateway. The egress gateway decodes the encoded voice signal in the RTP audio packets into a form used by an interfacing non-VoIP network. When the signal is classified as a DTMF signal, the DTMF signal is not processed by the voice codec of the access gateway. Rather, the signal is characterized based on parameters of the DTMF signal. This characterization information can be encapsulated in an RTP DTMF packet that is transmitted through the VoIP network to the egress VoIP gateway. The egress VoIP gateway can generate a proper DTMF signal based on the characterization information included in the DTMF packet.

Conventional signal classification processes implemented by access VoIP gateways can misclassify signals. For example, the VoIP gateways can misclassify a portion of a DTMF signal as a voice signal. Such misclassification can be a result of, for example, biasing the classification process towards voice classification and/or a delay in switching from a voice processing mode to a DTMF processing mode. When the initial energy of the DTMF signal is misclassified, the initial energy of the DTMF signal can be processed via the voice codec before switching to DTMF transmit mode. This imperfection is typically referred to as DTMF "leakage" since the initial DTMF energy is misclassified as a voice signal. That is, instead of properly classifying the signal as a DTMF signal, some of the DTMF signal "leaks" into the voice processing process implemented by the codec in the access VoIP gateway.

The consequence of DTMF leakage is that the egress VoIP gateway first receives an audio packet carrying false audio and then receives the DTMF characterization information associated with the remaining DTMF signal as one or more DTMF packets. The egress VoIP gateway responds by transmitting the false audio and then transmitting the DTMF signal into the non-VoIP network. As a result, instead of sending a properly formed DTMF signal into an interfacing non-VoIP network, a short burst of energy that represents the false audio is sent followed by a well formed DTMF signal. DTMF detectors in the non-VoIP interfacing network, for example a detector used with a conference service to screen participants using DTMF-based passcodes, can fail due to the false audio that precedes the DTMF signal. Such DTMF detection failures can have significant and negative effects on customer satisfaction, and thus can be a major problem for VoIP service providers. For example corrupted DTMF signals can cause the teleconferencing service to reject the calling party on the basis of a non-valid passcode entry.

SUMMARY

In one aspect, a method for eliminating false audio using an egress gateway in a communications network is disclosed. The method includes receiving a false audio packet by an egress gateway. The false audio packet including false audio. The method also includes receiving a DTMF packet by the egress gateway. The DTMF packet is received subsequent to the false audio packet. The method further includes replacing the false audio in the false audio packet with a substitute signal, such as silence, a low-level noise signal that matches the connection's background noise level, and the like, by the egress gateway.

In another aspect, a computer readable medium storing instructions executable by a computing system including at least one computing device is disclosed. Execution of the instructions implements a method for eliminating false audio using an egress gateway in a communications network. The method implemented by the execution of the instructions includes receiving a false audio packet by an egress gateway. The false audio packet includes false audio. The method implemented by the execution of the instructions also includes receiving a DTMF packet by an egress gateway. The DTMF packet is received subsequent to the false audio packet. The method implemented by the execution of the instructions further includes replacing the false audio in the false audio packet with a substitute signal, such as silence, a low-level noise signal that matches the connection's background noise level, and the like.

In yet another aspect, a system for eliminating false audio in a VoIP network is disclosed. The system includes a gateway configured to receive a false audio packet by an egress gateway. The false audio packet includes false audio. The gateway is also configured to receive a DTMF packet by an egress gateway. The DTMF packet is received subsequent to the false audio packet. The gateway is further configured to replace the false audio in the false audio packet with a substitute signal, such as silence, a low-level noise signal that matches the connection's background noise level, and the like.

Other objects and features will become apparent from the following detailed description considered in conjunction with the accompanying drawings. It is to be understood, however, that the drawings are designed as an illustration only and not as a definition of the limits of the invention.

DETAILED DESCRIPTION

Exemplary embodiments are directed to eliminating transmission of false audio associated with Voice over Internet Protocol (VoIP) networks. Exemplary embodiments can be implemented by an egress VoIP gateway in a VoIP network, such that upon receipt of packets transmitted over the VoIP network by an access gateway, the egress gateway can discard packets that have false audio. The egress VoIP gateway can replace false audio preceding one or more dual-tone multi-frequency (DTMF) packets with one or more packets containing a leakage substitution signal (hereinafter a "substitute signal"), such as silence, a low-level noise signal that matches the connection's background noise level, and the like. The substitute signal can be a signal that does not cause DTMF detectors in a non-VoIP network to fail when transmitted into a non-VoIP network in place of false audio prior to transmission of a DTMF signal. Using this approach, false audio can be discarded by the egress gateway so that the false audio is not played out into an interfacing non-VoIP network. As a result, front end distortion resulting from the false audio is eliminated and an appropriate DTMF signal can be transmitted into a non-VoIP network by the egress gateway.

Figure 1:
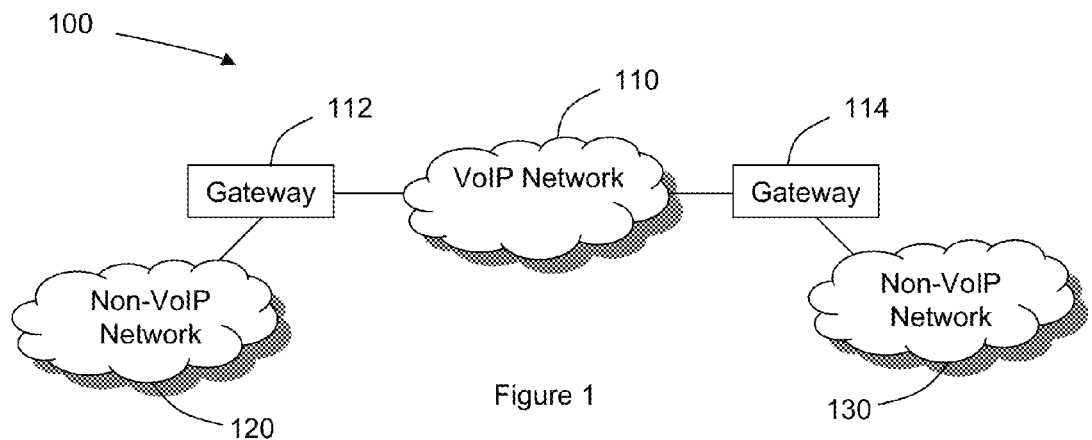
FIG. 1 shows an exemplary network for implementing VoIP communication.

FIG. 1 shows an exemplary communications network 100 (hereinafter "network 100") including a VoIP network 110, which can facilitate VoIP communication, and non-VoIP networks 120 and 130. The non-VoIP networks 120 and 130 can include components, such as local and inter-toll time division multiplexed (TDM) switches, digital loop carrier systems, digital cross-connects, multiplexers, and the like, the implementation of which are known to those skilled in the art. In some embodiments, the non-VoIP networks 120 and 130 can be configured as circuit switched networks, and the like, which can implement non-VoIP telephony protocols, such as time-division multiplexing and common channel signaling.

The VoIP network 110 can include one or more components, such as routing devices, switches, hubs, servers, and the like, the implementation of which are known to those skilled in the art. The components can be communicatively coupled for processing and routing VoIP packets in the VoIP network 110. The VoIP network 110 can also include VoIP gateways 112 and 114, which can function as access gateways and/or egress gateways. The VoIP gateways 112 and 114 can be electronic devices that provide entry points into the VoIP network 110 and/or exit points from the VoIP network 110. The VoIP network 110 can be implemented using the H.323 protocol, the Session Initiation Protocol (SIP), and/or other protocols for VoIP communication.

The gateways 112 and 114 can convert information received in a first format to information for transmission in another format. For example, the VoIP gateways 112 and 114 can convert an analog voice stream or a digitized version of the voice stream into Internet protocol (IP) packets, and/or can convert IP packets into an analog voice stream, or a digitized version of the voice stream. Access gateways refer to gateways that provide an entry point into a network and egress gateways refer to gateways that provide an exit point out of a network. The VoIP gateways 112 and 114 can be implemented as access gateways and/or egress gateways and can be communicatively coupled to each other via the one or more components in the VoIP network 110.

As one exemplary operation, information, such as voice and/or DTMF signals, or digitized versions of voice and/or DTMF signals, can be transmitted to the gateway 112 from the non-VoIP network 120. In this example, the gateway 112 can function as an access gateway to provide an entry point into the VoIP network 110. In some embodiments, the gateway 112 can classify signals as being either voice or DTMF and can digitize the signal. In some embodiments, the signal can be digitized and the digitized signal can be classified as being either a voice signal or a DTMF signal.

When the signal is a voice signal, the gateway 112 encodes the voice signal and generates a voice packet, such as a Real-time Transport Protocol (RTP) voice packet. When the signal is determined to be a DTMF signal, the gateway 112 can characterize the DTMF signal based on one or more parameters associated with the DTMF signal, such as a digit associated with the DTMF signal, an amount of power associated with the DTMF signal, and an amount of time or duration that the DTMF signal lasted. The gateway 112 generates a DTMF packet, such as an RTP DTMF packet, using the characterization of the DTMF signal. The DTMF packet can be transmitted by the gateway 112 over the VoIP network 110 to the gateway 114. The RTP DTMF packet can be generated in accordance with a DTMF relay standard, such as the DTMF relay standard defined by Request For Comments (RFC) 2833 from the Internet Engineering Task Force (IETF). In this example, the gateway 112 functions as an access gateway and the gateway 114 functions as an egress gateway.

In some instances, the gateway 112 can misclassify an initial energy associated with a DTMF signal as a voice signal. The misclassification of the initial energy of a DTMF signal as a voice signal is referred to herein as false audio. The gateway 112 can process the false audio using a voice processing mode of the gateway 112 to generate a voice packet that includes the false audio (hereinafter referred to as a "false audio packet") before the gateway 112 can switch to the DTMF processing mode, in which audio is suppressed and DTMF transmission across a VoIP network is accomplished. The false audio packet can be transmitted over the VoIP network 110 to the gateway 114, which processes the false audio packet using a voice processing mode.

After the initial energy associated with the DTMF signal is misclassified, the gateway 112 can switch to the DTMF processing mode and can process the remainder of the DTMF signal using the DTMF processing mode to generate one or more DTMF packets, which can include a characterization of the DTMF signal and can be transmitted to the gateway 114. The delay in switching from the voice processing mode to the DTMF processing mode can result from the classification processing implemented by the gateway 112. For example, the classification processing performed by the gateway 112 can be biased towards processing voice signals and/or can implement voice processing as a default until the gateway identifies a DTMF signal.

When the gateway 114 receives a false audio packet, the gateway 114 processes the packet using the voice processing mode. The gateway 114 can deconstruct the false audio packet and store the payload data (e.g., false audio) in a buffer of the gateway 114. Before the gateway 114 transmits the false audio to another network, such as the non-VoIP network 130, the gateway 114 can receive one or more of the DTMF packets including the characterization of the remaining DTMF signal, which was properly classified and processed by the gateway 112. The one or more DTMF packets can be generated using the RFC2833 standard. The gateway 114 can identify the packets as being DTMF packets based on a structure of the packets. Upon receipt and identification of a DTMF packet, the gateway 114 can implement a false audio elimination process. The false audio elimination process can replace false audio received by the gateway prior to the DTMF packets with a substitute signal, such as silence, a low-level noise signal that matches the connection's background noise level, and the like, so that the false audio is not transmitted or played out by the gateway 114. Subsequently, the gateway 114 can transmit the substitute signal followed by the appropriate DTMF signal generated by the gateway 114 using the characterization of the DTMF signal included in the one or more DTMF packets.

Figure 2:
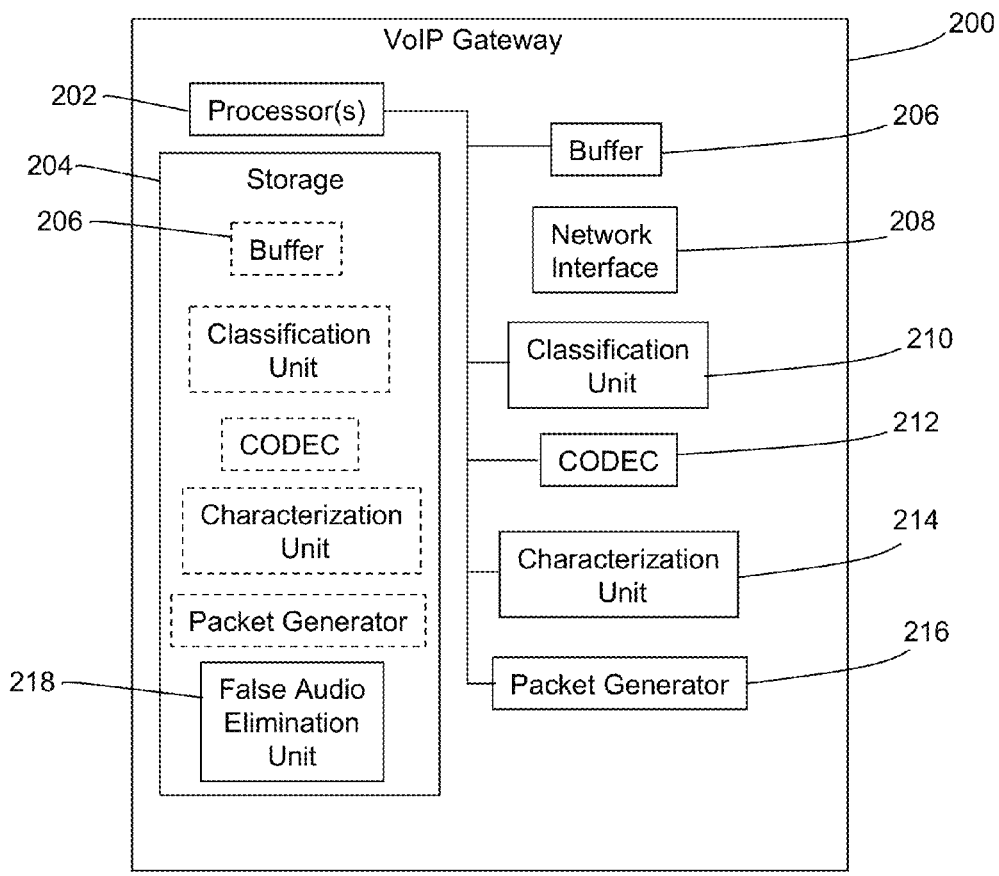
FIG. 2 is a block diagram of an exemplary media gateway device for identifying and eliminating false audio.

FIG. 2 is a block diagram of an exemplary VoIP gateway 200, which can be implemented as one or more of the VoIP gateways 112 and 114 (FIG. 1). The VoIP gateway 200 can be a computing device. In the illustrated embodiment, the VoIP gateway 200 can include one or more processors or controllers 202 (hereinafter processors 202"), such as a central processing unit (CPU), storage 204, a buffer 206, a network interface 208, a classification unit 210, a codec 212, a characterization unit 214, a packet generator 216, and a false audio elimination unit 218 (hereinafter "elimination unit 218"). The storage 204 can include computer readable medium technologies, such as a floppy drive, hard drive, tape drive, Flash drive, optical drive, read only memory (ROM), random access memory (RAM), and the like. The storage 204 can be local or remote to the device 200. The buffer 206, which can be separate and distinct from the storage 204 and/or can be integrated with storage 204, can store data for output by the gateway 200. The network interface 208 can facilitate communication over one or more networks.

The classification unit 210 can classify signals received by the gateway 200 when the gateway 200 functions as an access gateway. In some embodiments, the classification unit 210 can implement a classification scheme to classify incoming signals. For example, the classification unit 210 can use a classification scheme that filters the signals to determine whether frequency pairs associated with DTMF are present in the signals. In some embodiments, the classification unit 210 can be implemented using hardware and/or software. In some embodiments, the classification unit 210 can be resident in storage 204 (shown in phantom), and can be executed by the one or more processors 202 of the gateway 200. Classification schemes are well known and those skilled in the art will recognize that various classification schemes can be implemented to classify signals received by the gateway 200 for transmission over a VoIP network.

The codec 212 can be configured to encode and decode data, such as, for example, voice signals received by the gateway 200. In some embodiments, the codec 212 can be implemented using hardware and/or software. In some embodiments, the codec 212 can be resident in storage 204 (shown in phantom), and can be executed by the one or more processors 202 of the gateway 200. As one example, the codec can be configured to convert an analog signal, such as an analog voice signal, to a digital encoded signal (e.g., encode) and can be configured to convert an encoded digital signal into an analog signal (e.g., decode). The codec can apply compression when encoding signals to reduce an amount of bandwidth required to transmit the data. Some examples of codecs that that can be implemented for VoIP communications include G.711, G.722, G.723.1, G.726, G.729, GSM, iLBC, Speex, and the like.

The characterization unit 214 can characterize a DTMF signal received by an access gateway. In some embodiments, the characterization unit 214 can be implemented using hardware and/or software. In some embodiments, the characterization unit 214 can be resident in storage 204 (shown in phantom), and can be executed by the one or more processors 202 of the gateway 200. Characterization of a DTMF signal refers to processing a DTMF signal to extract parameter values of the DTMF signal that can be used to describe the DTMF signal. The parameter values extracted from the characterization of the DTMF signal can include, for example, a digit represented by the DTMF signal, an amount of power associated with the DTMF signal, a duration of the DTMF signal, and the like. In some embodiments, the parameter values can be encoded by an access gateway. The characterization of the DTMF signal can be encapsulated in a DTMF packet for transmission to an egress gateway. When the gateway 200 operates as an egress gateway, the characterization unit can deconstruct the DTMF packet received from an access gateway and can extract the parameter values represented as the payload data in the packet. A DTMF signal can be generated by the characterization unit using the parameter values in the packet. Thus, an actual DTMF audio signal is typically not transmitted over the VoIP network. Rather, a DTMF packet includes instructions for the egress gateway on how to generate a DTMF signal corresponding to the DTMF signal received by the access gateway.

The packet generator 216 can encapsulate the encoded voice signal or characterization of a DTMF signal to generate a packet, where the encoded signal or the characterization of the DTMF signal represents the payload of the packet. The packet generator 216 can generate packets using one or more protocols. For example, the packet generator can generate packets using the Real-time Transport Protocol (RTP). The RTP can define a standardized packet structures for transmission. The standardized packet structure can include a payload type section that can be used to identify the type of payload data being transmitted in the packet. For example, the payload type section can indicate whether the payload contains voice data or a characterization of a DTMF signal. In some embodiments, the packet generator 216 can be implemented using hardware and/or software. In some embodiments, the packet generator 216 can be resident in storage 204 (shown in phantom), and can be executed by the one or more processors 202 of the gateway 200.

Figure 3:
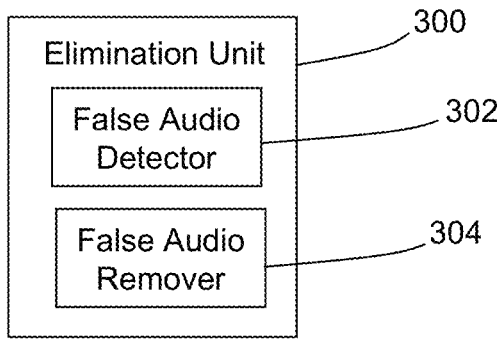
FIG. 3 is a block diagram of an exemplary false audio elimination unit implemented to eliminate false audio in VoIP communication.

The elimination unit 218 can be implemented using hardware and/or software. In the present embodiment, the elimination unit 218 can be a software application stored in the storage 204. FIG. 3 shows a block diagram illustrating an exemplary embodiment of the elimination unit 218. The elimination unit 218 can include a false audio elimination trigger detector 302 (hereinafter "trigger detector 302") and a false audio remover 304. The elimination unit 218 can be implemented when the gateway 200 (FIG. 2) operates as an egress gateway. The elimination unit 218 can eliminate false audio transmitted by an access gateway in a VoIP network. The elimination unit 218 can include instructions, which when executed by the one or more processors 202 (FIG. 2), can facilitate a false audio elimination process.

The trigger detector 302 can initiate the false audio elimination process performed by the elimination unit 218. The trigger detector can monitor incoming data packets (i.e., packets being received by an egress gateway). When the egress gateway receives a DTMF packet, for example, a DTMF packet formed in accordance with RC2833, the trigger detector triggers the false audio elimination process to eliminate false audio received in one or more packets preceding the DTMF packet. Once a DTMF is received and the false audio elimination process is initiated, the false audio remover 304 performs the false audio elimination.

The false audio remover 304 can identify the one or more packets received before the DTMF packet that triggered the false audio elimination process. For example, the false audio remover can determine which payload data stored in the buffer corresponds to the false audio packets and can determine an amount of data in the buffer to be replaced by substitute signal. Once the false audio remover 304 identifies the false audio stored in the buffer, the false audio remover 304 replaces the false audio with a substitute signal. For example, the false audio remover 304 replaces the false audio with silence by inserting zeroes in the buffer in place of the payload representing the false audio. The duration of the substitute signal (e.g., silence) inserted into the buffer can correspond to the duration that the false audio would have occupied. In this manner, the false audio is discarded before the egress gateway can transmit or played out the false audio into a non-VoIP network. The substitute signal (e.g., silence) can be transmitted or played out by the egress gateway in place of the false audio and the DTMF signal corresponding to the DTMF packet can be generated and transmitted or played out thereafter.

Figure 4:
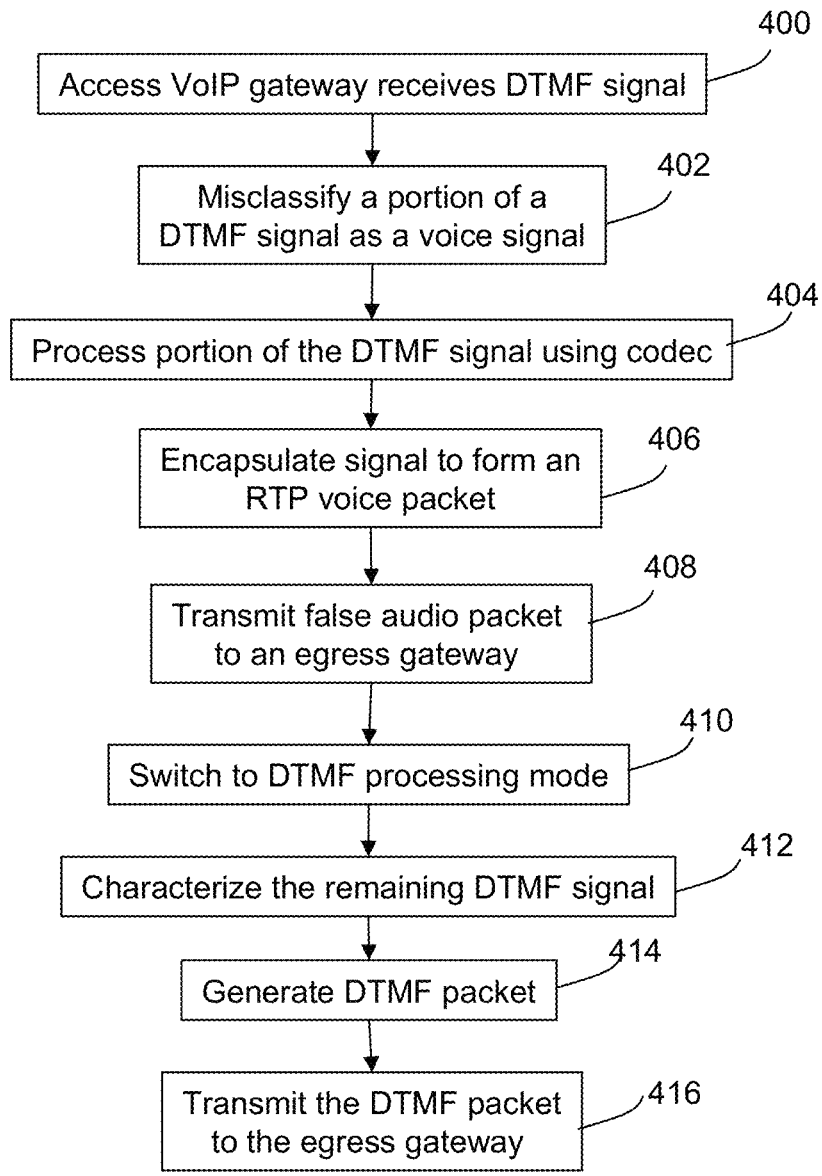
FIG. 4 is a flowchart that shows a VoIP communication process.

FIG. 4 is a flowchart illustrating the processing of data in a VoIP gateway functioning as an access gateway. The access gateway can receive an analog signal representing voice communication or a DTMF signal from, for example, a first non-VoIP network (400). An initial energy of the DTMF signal can be misclassified as a voice signal by the access gateway (402). For example, the first n milliseconds of the DTMF signal can be misclassified. The initial energy of the DTMF signal classified as a voice signal represents false audio and is processed by the access gateway using a voice codec (404). The access gateway encapsulates the signal to form a false audio packet (e.g., an RTP voice packet including payload data representing the false audio) (406). The false audio packet is transmitted over the VoIP network to an egress gateway (408).

After the initial energy of the DTMF signal is misclassified, the access gateway can switch to a DTMF processing mode (410). The remaining energy of the DTMF signal can be characterized by the access gateway (412) and can generate a DTMF packet based on the RFC2833 standard (414). The DTMF packet can include payload data representing a characterization of the DTMF signal such that the actual DTMF signal is not transmitted over the VoIP network. The DTMF packet can be an RTP DTMF packet and can be transmitted to the egress gateway consecutively after the false audio packet (416).

Figure 5:
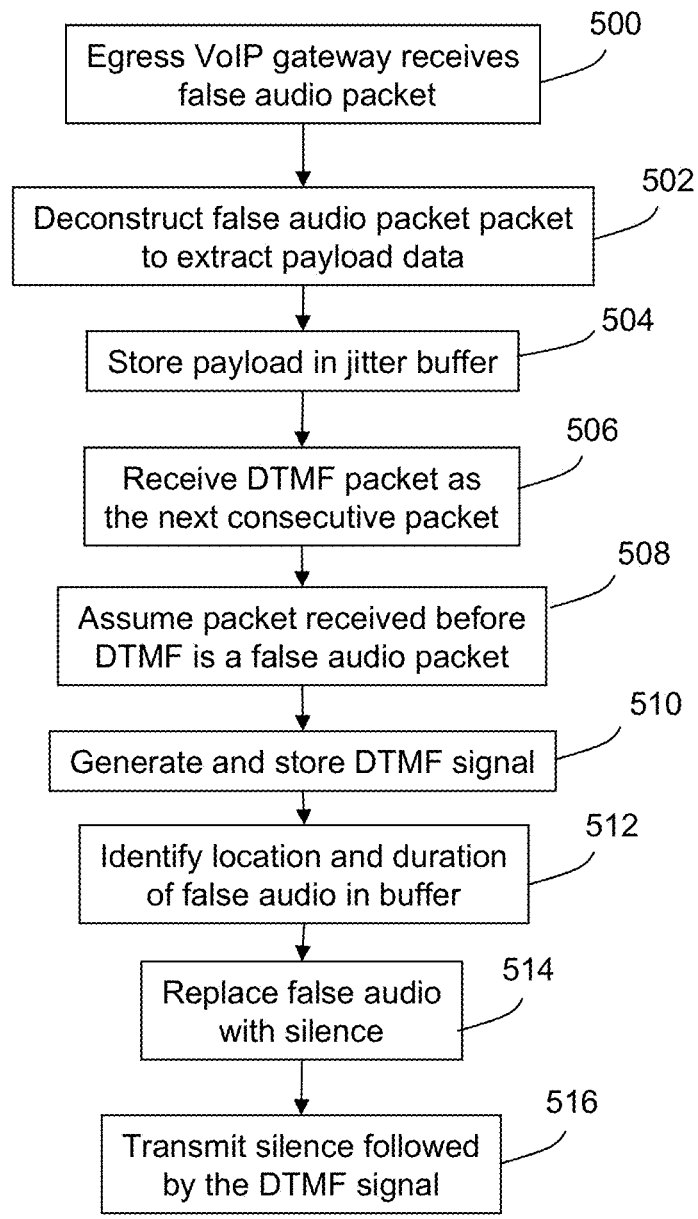
FIG. 5 is a flowchart that shows an elimination of false audio using an egress gateway in a VoIP network.

FIG. 5 is a flow diagram illustrating the processing of data in a VoIP gateway functioning as an egress gateway. The egress gateway can receive a false audio packet that includes false audio, which corresponds to a misclassification of an initial energy of a DTMF signal by an access gateway (500). The egress gateway can deconstruct the false audio packet (502) and store the payload data representing the false audio in a buffer (504). When the gateway receives a DTMF packet from the access gateway as the next consecutive packet (506), the egress gateway assumes that one or more of the preceding packets are false audio packets (508). The payload data of the DTMF signal represents a characterization of DTMF signal having parameter values identified in the DTMF packet and the gateway generates a DTMF signal, which can be stored in the buffer until it is transmitted or "played out" (510). In response to the receipt of a DTMF packet, the gateway identifies the location and duration of the false audio in the buffer (512). The gateway replaces the payload data in the buffer corresponding to the false audio with zeroes so that the false audio is eliminated from the buffer and a substitute signal comprising, for example, silence can occupy the space previously occupied by the false audio (514). The gateway transmits or "plays out" the contents of the buffer, which results in the transmission of the substitute signal followed by the proper DTMF signal (516).

It is understood that the embodiments described herein can be implemented in hardware, software, or a combination of hardware and software. For example, embodiments can be implemented using a computer system configured to execute instructions of a computer program (e.g., applications), which can control an operation of the computer system such that it carries out embodiments described herein. The computer system can include one or more computing devices (e.g., service provider units), and in some embodiments the computer system can be implemented as a distributed system of networked computing devices, where the computing device can implement portions of an application, such as the diagnostic engine, to facilitate diagnosis of problems in a dual stack network. Alternatively, a specific use computer, containing specialized hardware for carrying out embodiments can be utilized.

Terms such as applications, computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While preferred embodiments of the present invention have been described herein, it is expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. A method of decreasing false audio associated with voice over Internet protocol, the method comprising:

receiving a false audio packet by an egress gateway, the false audio packet including false audio, the false audio being generated by misclassification of an initial portion of a dual-tone multi-frequency signal as a voice signal by an access gateway, the voice signal being transmitted over a communications network to the egress gateway;

receiving a dual-tone multi-frequency packet by the egress gateway, the dual-tone multi-frequency packet being received subsequent to the false audio packet, the dual-tone multi-frequency packet being associated with a remaining portion of the dual-tone multi-frequency signal;

deconstructing the false audio packet by the egress gateway to extract the false audio;

replacing the false audio with a substitute signal by the egress gateway in response to deconstructing the false audio packet; and storing payload data representing the false audio in a buffer in response to deconstructing the false audio packet, wherein replacing the false audio in the false audio packet comprises replacing the payload data stored in the buffer with zeroes.

2. The method of claim 1, wherein receipt of the dual-tone multi-frequency packet is a trigger that initiates elimination of the false audio.

3. The method of claim 1, wherein the false audio is generated by a misclassification of initial energy of a dual-tone multi-frequency signal by an access gateway.

4. The method of claim 1, further comprising:
- deconstruction of the dual-tone multi-frequency packet, the dual-tone multi-frequency packet including a characterization of dual-tone multi-frequency parameters; and
- generating a dual-tone multi-frequency signal using the characterization of dual-tone multi-frequency parameters.

5. The method of claim 4, further comprising:
- transmitting the substitute signal in place of the false audio from the egress gateway; and
- transmitting the dual-tone multi-frequency signal.

6. A non-transitory computer readable medium storing instructions that, when executed by a computing device, cause the computing device to perform a method of decreasing false audio associated with voice over Internet protocol comprising:
- receiving a false audio packet by an egress gateway, the false audio packet including false audio, the false audio being generated by a misclassification of an initial portion of a dual-tone multi-frequency signal as a voice signal by an access gateway, the voice signal being transmitted over a communications network to the egress gateway;
- receiving a dual-tone multi-frequency packet by the egress gateway, the dual-tone multi-frequency packet being received subsequent to the false audio packet, the dual-tone multi-frequency packet being associated with a remaining portion of the dual-tone multi-frequency signal;
- deconstructing the false audio packet by the egress gateway to extract the false audio;
- replacing the false audio with a substitute signal by the egress gateway in response to deconstructing the false audio packet; and
- storing payload data representing the false audio in a buffer in response to deconstructing the false audio packet, wherein replacing the false audio in the false audio packet comprises replacing the payload data stored in the buffer with zeroes.

7. The medium of claim 6, wherein receipt of the dual-tone multi-frequency packet is a trigger that initiates elimination of the false audio.

8. The medium of claim 6, wherein the false audio is generated by a misclassification of initial energy of a dual-tone multi-frequency signal by an access gateway.

9. The medium of claim 6, wherein the method further comprises:
- deconstruction of the dual-tone multi-frequency packet, the dual-tone multi-frequency packet including a characterization of dual-tone multi-frequency parameters; and
- generating a dual-tone multi-frequency signal using the characterization of dual-tone multi-frequency parameters.

10. The medium of claim 9, wherein the method further comprises:
- transmitting the substitute signal in place of the false audio from the egress gateway; and
- transmitting the dual-tone multi-frequency signal.

11. A system of decreasing false audio associated with voice over Internet protocol, the system comprising an egress gateway to receive a false audio packet, receive a dual-tone multi-frequency packet, deconstruct the false audio packet to extract false audio, and replace the false audio with a substitute signal, the false audio packet including the false audio, the dual-tone multi-frequency packet being received subsequent to the false audio packet, the false audio being generated by a misclassification of an initial portion of a dual-tone multi-frequency signal as a voice signal, the dual-tone multi-frequency packet being associated with a remaining portion of the dual-tone multi-frequency signal, the egress gateway storing payload data representing the false audio in a buffer in response to deconstructing the false audio packet, wherein replacing the false audio in the false audio packet comprises replacing the payload data stored in the buffer with zeroes.

12. The system of claim 11, wherein the gateway is configured to deconstruct the dual-tone multi-frequency packet, the dual-tone multi-frequency packet including a characterization of dual-tone multi-frequency parameters, the gateway being configured to generate a dual-tone multi-frequency signal using the characterization of dual-tone multi-frequency parameters.

13. The system of claim 12, wherein the gateway is configured to transmit the substitute signal in place of the false audio from the egress gateway and transmit the dual-tone multi-frequency signal.

* * * * *